United States Patent Office 2,798,857
Patented July 9, 1957

2,798,857

CRACKING CATALYSTS PRODUCTION

Charles Newton Kimberlin, Jr., and Elroy Merle Gladrow, Baton Rouge, La., assignors to Esso Research and Engineering Company, a corporation of Delaware No Drawing. Application November 29, 1954,
Serial No. 471,886

3 Claims. (Cl. 252—453)

This invention relates to the preparation of cracking catalysts containing silica and alumina and more particularly relates to the preparation of high alumina catalysts.

The conventional commercial synthetic silica-alumina catalysts are derived principally from inorganic salts such as sodium silicate, aluminum sulfate and sodium aluminate. For example, when a sodium silicate solution is mixed with an acid such as sulfuric acid to form silica hydrosol which converts to a silica hydrogel, there also results the formation of a considerable amount of soluble salts such as sodium sulfate which is taken up by the hydrogel. These salts must be removed by a suitable washing technique if the hydrogel is to be used in the manufacture of a silica-alumina catalyst or the like.

While such silica-alumina catalyst containing less than about 20% alumina by weight can be washed satisfactorily in a reasonably short time, this time interval and quantity of wash water required for suitable washing increases markedly with synthetic silica-alumina compositions containing 30-40% or more of alumina by weight. Recent investigations have indicated that synthetic silica alumina catalysts containing 30-40% by weight of alumina have high activity, high steam stability and good resistance to the effects of contaminants present in catalytic cracking feed stocks.

According to the present invention high alumina containing silica-alumina have been prepared in a simple manner without the need for washing to remove soluble salts from the final product. Catalysts of any silica-alumina composition may be prepared. The catalysts prepared according to this invention exhibit outstanding activity, steam stability and selectivity.

With the present invention silica hydrosol is first formed by percolating sodium silicate solution through a bed of acid form cation exchange resin. The silica hydrosol so prepared is free of metal ions and to it is added an ammonium hydroxide solution with stirring to raise the pH of the silica hydrosol and maintain it above a pH of about 8.0 at all times. Other alkaline solutions of non-metallic bases may be used instead of the ammonium hydroxide. Or the silica hydrosol may be prepared by other methods using cation exchange material.

To the ammoniated or alkaline silica hydrosol anhydrous aluminum alcoholate is added using rapid and efficient stirring to form a thin slurry. The thin slurry is then gelled by the addition of an acid such as acetic, formic, chloro-acetic and the like. The alcohol formed by the hydrolysis of the aluminum alcoholate can be drained off and recovered or rejected and the silica-alumina hydrogel dried without washing.

Instead of using an exchange resin in the acid form, an ammonium form cation exchange resin can be used to prepare a non-metallic alkaline silica hydrosol having a pH of about 9 to 11 which is used directly as the hydrolysis medium for the aluminum alcoholate. After hydrolysis is completed by mixing of the alkaline silica hydrosol and the aluminum alcoholate, the resulting slurry has added to it an acid such as acetic acid to cause setting of the hydrosol to the hydrogel. The silica-alumina hydrogel can be dried without any water washing being necessary.

In the preparation of the acid silica hydrosol any suitable cation exchange material which operates on a hydrogen regenerating cycle and is substantially stable to dilute alkaline and acid solutions may be used. Cation exchange materials are available as commercial products and such commercial products are well known in the art, are referred to by trade names in articles on cation exchange processes and are understood by those skilled in the art. These materials are referred to as "Dowex 50," "Amberlite IR-120," "Nalcite," "Zeocarb." One of the preferred cation exchange resins is described as copolymerized styrene and divinyl benzene containing nuclear sulfonic acid groups made by the process described in D'Alelio Patent No. 2,366,007 and which is fully described as to its characteristics, properties and general method of use in the J. A. C. S. for November, 1947, vol. 69, No. 11, beginning at page 2830. Dowex 50 is of the type prepared under the D'Alelio patent. The Dowex resins are sold by the Dow Chemical Co. of Midland, Michigan.

The cation exchange materials are treated with an acid such as sulfuric acid or the like to put them in the hydrogen cycle for use in removing cations or sodium ions in this particular case.

Other cation exchange materials which may be used are those materials obtained by condensing aldehydes such as formaldehyde with phenol or with phenol-carboxylic acids. Or cation exchange materials may be made by sulfuric acid treatment of coal or wood or waste petroleum sludge or lignite.

Any of the commercially available alkali metal silicates can be used for making the silica hydrosol, such as those from 2 $Na_2O \cdot SiO_2$ to $Na_2O \cdot 3.5\ SiO_2$. The common silicate is sodium silicate having the approximate composition $Na_2O \cdot 3.25\ SiO_2$ and it is diluted so that it contains not more than about 150 g. of $SiO_2$ per liter and preferably not more than about 80 g. of $SiO_2$ per liter.

When sodium silicate or other alkali metal silicate is percolated through a cation exchange resin bed, the alkali metal is removed from the silicate solution and replaced by hydrogen so that an exceedingly pure silica hydrosol is obtained. The capacity of the exchange resin should not be exceeded and the silica hydrosol leaving the exchange resin should not contain more than about 0.2% soda ($Na_2O$), preferably below 0.1% soda calculated on a dry basis.

After the cation exchange resin has been used for some time, it becomes nearly spent which is determined by the amount of sodium ions going through to the silica hydrosol and it is necessary to regenerate the resin. Regeneration of these resins is well known in the art and will not be described in detail here. It is sufficient to say that the exhausted resin is washed with water and regenerated with an acid such as sulfuric acid or hydrochloric acid to replace the alkali metal ions in the resin with hydrogen with the formation of sodium sulfate or chloride depending on the acid used in the regeneration. After rinsing with water, the resin is ready for another exchange step.

The aluminum alcoholate is preferably prepared by the process described in Kimberlin Patent No. 2,636,865, granted April 28, 1953, and contains aluminum alcoholate dissolved in a hydrocarbon solvent. While an insoluble or substantially water insoluble alcohol such as amyl alcohol is preferred, water soluble alcohols may be used.

*Example I*

Twenty liters of fresh silica hydrosol (3% $SiO_2$ by weight) having a pH of about 2.9 were prepared by percolating sodium silicate solution through a bed of acid form cation exchange resin of the nuclear sulfonic acid cation exchange resin type made by sulfonation with sulfuric acid of the polymer prepared from a mixture of styrene and divinyl benzene according to the D'Alelio Patent No. 2,366,007 and sold commercially as Dowex 50. The silica hydrosol was added with stirring to a solution comprising 100 cc. concentrated $NH_4OH$ in 5 liters of distilled water. The resulting silica hydrosol was at a pH of about 8.70. To this mixture were added 4 liters of anhydrous aluminum amylate solution using rapid and efficient stirring.

Stirring was accomplished by means of a three-bladed propeller having a diameter of 2½ inches driven at a speed of about 1725 R. P. M. by an electric motor. The aluminum amylate solution was prepared by dissolving 10 pounds of aluminum metal in 23 gallons of a 50/50 mixture of mixed amyl alcohols and petroleum naphtha boiling in the range of 200° to 300° F. according to the method described in U. S. Patent No. 2,636,865.

By thus mixing the silica hydrosol and the anhydrous aluminum amylate solution with stirring a hydrous slurry of silica-alumina having a pH of about 8.55 was obtained.

After continued stirring for 15 minutes, 35 cc. of glacial acetic acid were added to lower the pH to about 7.0. After stirring for about 4 to 5 minutes, additional, the slurry set to a stiff gel. The alcohol was drained off and rejected and the remaining gel was dried in an oven at a temperature of about 250° F. for about 16 hours. The oven dried gel was then made into 3/16 inch by 3/16 inch cylindrical pellets. The resulting gel catalyst comprises about 40% $Al_2O_3$ and 60% $SiO_2$ by weight and is designated as catalyst "A" for a comparison to be presently made.

*Example II*

Thirty liters of fresh silica hydrosol (3% $SiO_2$ by weight) were prepared as in Example I by percolating sodium silicate solution through a bed of the same type resin described in Example I. The silica hydrosol, having a pH of about 3.0 was added to 10 liters of a solution containing 150 cc. concentrated $NH_4OH$. The resulting pH of the mixture was about 8.7. After continued stirring for about 10 minutes about 6.5 liters of aluminum alcoholate solution, prepared as described in Example I, were added to the ammoniacal silica sol at a rate of about 1 liter per minute. Stirring was continued for another 10 minute period after which 250 cc. glacial acetic acid were added to lower the pH to about 5.05. The mixture set to a firm gel in about 5 seconds. The alcohol was drained off and recovered for re-use. The gel was broken up with a paddle and dried in an oven at about 250° F. for about 16 hours. The oven dried gel was then made into 3/16 inch by 3/16 inch cylindrical pellets. The resulting gel catalyst comprises about 40% $Al_2O_3$ and 60% $SiO_2$ by weight and is designated catalyst "B" for a comparison to be made presently.

*Example III*

Thirty liters of fresh silica hydrosol (3% by weight) were prepared as in Example I by percolating sodium silicate solution through a bed of the same type resin described in Example I. The silica hydrosol, having a pH of about 3.0 was added to 10 liters of a solution containing 150 cc. concentrated $NH_4OH$. The pH of this mixture was about 8.7. After continued stirring for about 10 minutes about 6.5 liters of aluminum alcoholate solution, prepared as described in Example I, were added to the ammoniacal silica sol at a rate of about 1 liter per minute. After stirring, for an additional 10 minutes, the pH was readjusted to about 8.7 by the addition of a small amount of $NH_4OH$. The slurry of silica-alumina did not gel. The alcohol was drained off and recovered for re-use. The slurry of silica-alumina was dried in an oven at about 250° F. for about 16 hours. The oven dried material was then made into 3/16 inch by 3/16 inch cylindrical pellets. The resulting catalyst comprises about 40% $Al_2O_3$ and 60% $SiO_2$ by weight and is designated as catalyst "C" in a comparison to be made presently.

*Example IV*

Thirty liters of fresh silica hydrosol (3% by weight) were prepared as in Example I by percolating sodium silicate solution through a bed of the same type resin described in Example I. In a separate vessel twenty liters of a solution comprising 35 cc. acetic acid were charged. To this were added 6.5 liters of aluminum alcoholate solution, prepared as described in Example I using an electrically driven stirrer during the addition. The alcohol-hydrocarbon layer was distilled from the mixture by blowing the mixture with steam. The remaining hydrous alumina mixture had a pH of 4.6.

The thirty liters of silica sol (pH 3.12) were mixed with the twenty liters of hydrous alumina (pH 4.6). The resulting mixture was at pH 3.63. The pH of the mixture was raised to 6.5 by adding 175 cc. $NH_4OH$. The slurry of silica-alumina was dried in an oven at about 250° F. for about 16 hours. The oven dried material was then made into 3/16 inch by 3/16 inch cylindrical pellets. The resulting catalyst comprises 40% $Al_2O_3$ and 60% $SiO_2$ by weight and is designated catalyst "D" in a comparison to be made presently.

*Example V*

Catalysts "A," "B," "C" and "D" as freshly prepared were all of excellent quality for cracking gas oil. However, they differed among themselves in their resistance to deactivation by steam. To demonstrate this, the catalysts were separately deactivated by subjecting them to steam at 1050° F. and 60 p. s. i. g. pressure for 24 hours. The de-activated catalysts were subjected to a fixed bed cracking operation using as feed a light gas oil having a gravity of 33.8° API derived from East Texas crude. The tests were made at 850° F. and a liquid feed rate of 0.6 volume of gas oil feed per volume of pelleted catalyst per hour for a two hour period. The gasoline yield (percent D+L) and selectivity to carbon and gas are tabulated below. The gas producing factor is the ratio between the volumetric yield of dry gas from the catalyst in question to that of a fresh, uncontaminated heat or steam deactivated standard reference catalyst comprising 13% $Al_2O_3$ and 87% $SiO_2$ at the same conversion level. The carbon producing factor is the ratio of the amount of carbon made by the catalyst in question to that of a fresh, uncontaminated heat or steam deactivated standard reference catalyst comprising 13% $Al_2O_3$ and 87% $SiO_2$ at the same conversion level.

| Catalyst | "A" | "B" | "C" | "D" |
|---|---|---|---|---|
| Volume Percent D+L | 44.0 | 41.5 | 36.0 | 35.0 |
| Gas Producing Factor | 1.2 | 1.2 | 1.3 | 1.8 |
| Carbon Producing Factor | 1.0 | 1.0 | 1.3 | 1.3 |

The data in the above table show the superior performance of catalysts "A" and "B," after being subjected to steam, prepared according to the present invention.

*Example VI*

Forty-two liters of fresh silica sol (3% $SiO_2$ by weight) having a pH of 10.30 were prepared by percolating sodium silicate solution through a bed of ammonium form cation exchanger of the nuclear sulfonic acid type. The ammonium form of the cation exchanger was prepared by percolating 10% $NH_4OH$ solution through the bed until about 10 equivalents of $NH_4OH$ per equivalent of exchanger had been added. The column of exchanger was washed with water prior to introducing the sodium silicate solution. The 42 liters of ammoniacal silica sol were stirred with an electrically driven stirrer. About 5.25 liters of aluminum alcoholate solution, prepared as described in Example I, were added to the ammoniacal silica sol at a rate of about 1 liter per minute. After stirring an additional 10 minutes, 200 cc. of glacial acetic acid were added lowering the pH of the mixture to 9.7. About 5 minutes after addition of the acetic acid the mixture set to a gel. The gel was broken up, the alcohol layer drawn off and recovered for re-use. After drying the gel in an oven at about 250° F. for 16 hours the material was made into the form of 3/16" by 3/16" cylindrical pellets. The resulting gel catalyst comprises about 28% $Al_2O_3$ and 72% $SiO_2$ by weight. The catalyst pellets were deactivated by subjecting them to steam at 1050° F. and 60 p. s. i. g. pressure for 24 hours. The catalyst was tested in a fixed bed testing unit using a light gas oil from East Texas crude as the feed stock. The test was made at 850° F. and a liquid feed rate of 0.6 volume of gas oil per volume of pelleted catalyst per hour for a two hour period. The product showed a gasoline yield of 33 volume percent and a carbon producing factor of only 0.7. Gas and carbon producing factors were described in Example V above. For comparison, a commercial cracking catalyst containing about 13% alumina when steamed under the same conditions as above given and when tested under the same conditions showed a gasoline yield of 26 volume percent and a carbon producting factor of 1.0.

Instead of starting with an acid or alkaline silica hydrosol of about 3% $SiO_2$ content by weight, silica hydrosols containing 2 to 10% $SiO_2$ or more may be used. The alkaline silica hydrosol may have a pH between about 8 and 11. The amount of alumina in the synthetic silica alumina gel catalyst prepared according to this invention may be as high as 50% with the remainder being substantially all silica. However, lower alumina content catalysts, for example, catalysts containing 20% or higher alumina, can be readily prepared according to the invention.

Alcoholates of aluminum other than the amylate may be used such as those made from ethyl and propyl alcohol, n-butyl alcohol, secondary butyl, and isobutyl alcohol, mixtures of amyl alcohols, and the higher alcohols which are liquid at the temperature of the operation of the process, at least up to the octyl alcohols.

In Example I the stirring of the aluminum alcoholate solution and the alkaline silica hydrosol can be continued for 1 to 30 minutes or longer. The time of stirring is not critical but must be of such character or for such a time as to get thorough mixing and blending of the two solutions.

Acids other than glacial acetic acid may be used as above given or dilute acetic acid may be used. The amount of glacial acetic acid added in Examples I, II and VI depends on the pH desired in the mixture following the acid addition. Or the pH of the mixture following addition of the glacial acetic or other acid should be in the range of about 4.5 to 10, preferably 5 to 8. Following the addition of the acid to the mixture stirring may be continued from a few seconds to about 6 minutes before the mixture sets up to a stiff gel depending on the pH and concentration of the mixture.

When preparing an acid silica hydrosol by percolation over cation exchange material, the acid silica hydrosol so prepared may be made alkaline by the addition of alkaline materials other than ammonium hydroxide, such as alkaline solutions of non-metallic bases such as urea, hexamethylene tetramine, ethanol amine, and the like. If desired, the gelled catalyst may be spray dried to give microspheres. In the preparation of the catalyst which is made according to our invention no washing of the catalyst is necessary since there are no dissolved non-volatile salts in the slurry. The temperature of cracking may be between about 850° and 1000° F.

What is claimed is:

1. A method of preparing a catalyst which comprises first preparing a substantially pure acidic silica hydrosol by the cation exchange method, then adding an ammonia-containing liquid to said acidic silica hydrosol to produce an ammoniacal silica hydrosol having a pH of at least about 8.0, then mixing said ammoniacal silica hydrosol with an aluminum alcoholate solution to hydrolyze the alcoholate and continuing the mixture to form a silica-alumina mixture having a pH on the alkaline side, then adding glacial acetic acid to lower the pH of the silica-alumina mixture to between about 5 and 7 to form a gelling of the mixture, using a sufficient amount of aluminum alcoholate to produce a final dry silica-alumina gel containing at least 25% by weight of alumina, and removing water from the gelled silica-alumina mixture to produce a dry hard silica-alumina catalyst.

2. A method of preparing a catalyst which comprises first preparing a substantially pure acidic silica hydrosol by the cation exchange method, then adding an alkaline solution of a non-metallic base to said acidic silica hydrosol to produce an alkaline silica hydrosol having a pH at least about 8.0, then mixing said alkaline silica hydrosol with an aluminum alcoholate solution to hydrolyze the alcoholate and continuing the mixing to form a silica-alumina mixture having a pH on the alkaline side, then adding acetic acid to lower the pH of the silica-alumina mixture to between about 5 and 7 to form a gelling of the mixture, using a sufficient amount of aluminum alcoholate to produce a final dry silica-alumina gel containing at least 25% by weight of alumina, and removing water from the gelled silica-alumina mixture to produce a dry hard silica-alumina catalyst.

3. A method of preparing a cracking catalyst which comprises preparing an alkaline substantially pure silica hydrosol having a pH above about 8.0, mixing said alkaline silica hydrosol with a sufficient amount of an aluminum alcoholate to hydrolyze the alcoholate and to produce a final dry silica-alumina product containing about 40% by weight of alumina, continuing the mixing to form a slurry containing silica and alumina, adding acetic acid to said slurry to lower the pH of the mixture to between about 5 and 7 to produce silica-alumina hydrogel and then drying said hydrogel to produce a silica-alumina catalyst containing about 40% alumina by weight.

References Cited in the file of this patent

UNITED STATES PATENTS 2,673,188    Schexnailder _____ Mar. 23, 1954

FOREIGN PATENTS 708,168    Great Britain _____ Apr. 28, 1954